June 2, 1959  B. B. FELTS  2,888,836
DEPRESSIBLE STEERING WHEEL FOR AUTOMOTIVE VEHICLES
Filed March 24, 1958
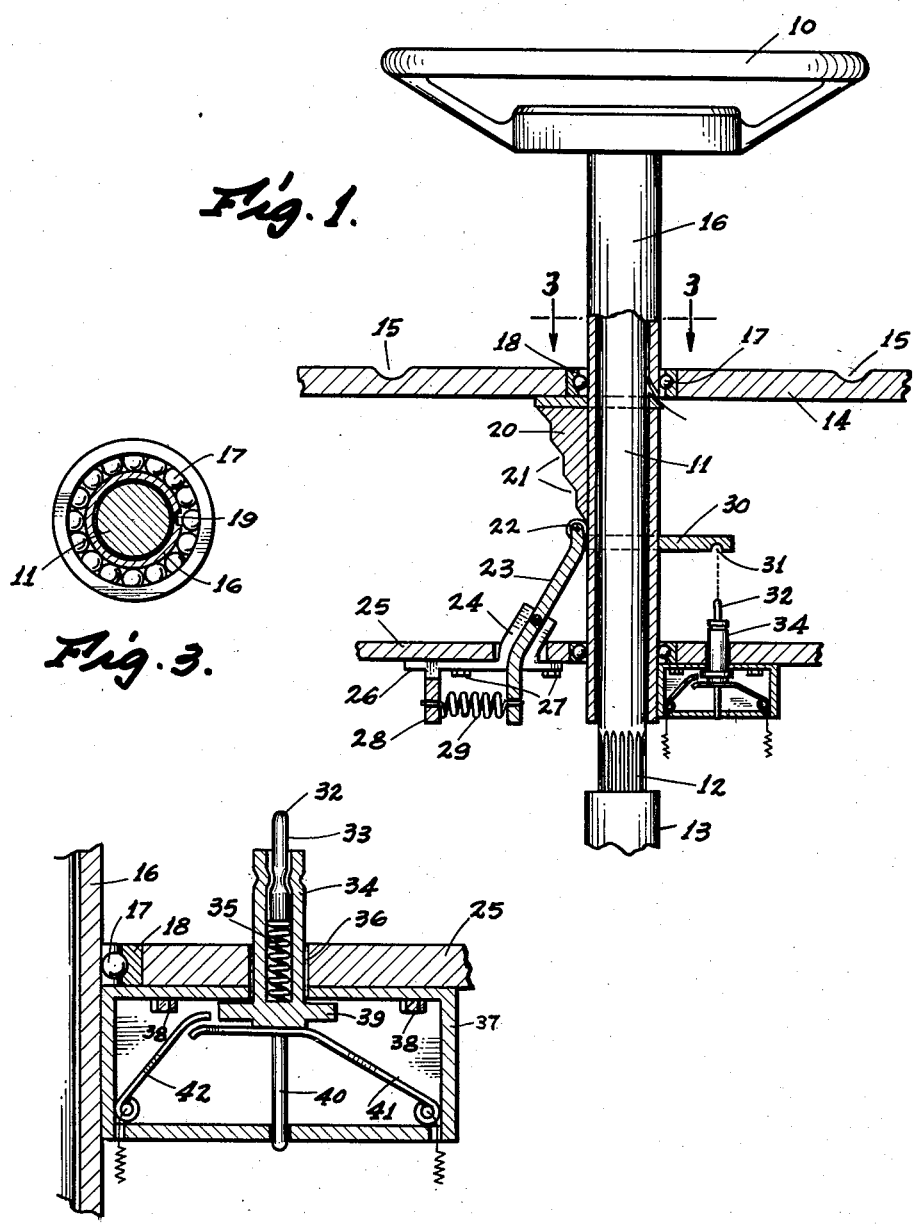
INVENTOR.
BASIL B. FELTS
BY Robert C. Comstock
ATTORNEY

United States Patent Office 2,888,836
Patented June 2, 1959

2,888,836
DEPRESSIBLE STEERING WHEEL FOR AUTOMOTIVE VEHICLES

Basil B. Felts, Banning, Calif.

Application March 24, 1958, Serial No. 723,263

8 Claims. (Cl. 74—493)

This invention relates to a depressible steering wheel construction for automotive vehicles.

It is a well-known fact that large numbers of persons are killed or seriously injured due to impact with the steering wheel and steering assembly of an automotive vehicle upon the occurrence of a collision. It is an object of this invention to provide a depressible steering wheel construction for automotive vehicles which is adapted to automatically yield beneath the impact of the driver's body in the event of a collision. It is a further object of the invention to provide such a structure in which its yieldability does not interfere in any way with the operation and driving control of the steering assembly.

It is another object of the invention to provide a device of the type described which is simple in construction and design, requiring only a limited number of easily manufactured and assembled parts, so that it is capable of widespread use by manufacturers and the general public. It is a related object of the invention to provide such a structure which may be installed as original equipment at the time an automotive vehicle is manufactured or which may be easily, quickly and economically installed on any new automotive vehicle.

It is a further object of the invention to provide such a device in which the steering wheel may be depressed a short distance against a small amount of resistance or a greater distance against increased resistance.

In essence, my invention contemplates a depressible steering wheel assembly in which a plurality of notches or teeth are resiliently engaged in such a manner that the steering wheel may be depressed in a series of steps and in which its continued depression encounters increased resistance from the resilient means employed to resist the downward movement of the wheel.

It is accordingly an object of my invention to provide a steering assembly having all of the features and advantages of the construction set forth.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings,

Fig. 1 is a side elevational view mostly in section of one embodiment of my steering wheel construction;

Fig. 2 is an enlarged sectional view of the ignition cut-off assembly;

Fig. 3 is a sectional view taken on line 3—3 of Fig. 1.

A preferred embodiment which has been selected to illustrate my invention is shown in Figs. 1-3 of the drawings. It comprises a steering wheel 10, which is rotatably mounted on the upper end of a steering column 11, the lower end of which carries a plurality of splines 12 which connect it to the receiver 13. The dashboard 14 of the vehicle may be suitably padded and may be provided with depressed areas 15 for receiving the steering wheel when it is depressed.

The steering column 11 is mounted in a steering column housing 16, which passes through an opening in the dashboard 14 and is surrounded by a plurality of ball bearings 17, which are mounted in a race 18. The ball bearings 17 facilitate the downward movement of the steering column housing 16. The steering column housing 16 is provided with an elongated groove 19 into which fits a stationary element which comprises a part of or which is secured to the dashboard, in order to prevent undesirable rotation of the steering column housing 16. Similar ball bearings 17 are provided where the steering column housing 16 passes through the floor 25.

Attached to the steering column housing 16 directly beneath the dashboard 14 is a stop member 20 which has a plurality of adjacent notches or steps 21. These steps 21 are engaged by a roller 22, which is rotatably mounted on the upper end of a lever arm 23, which is pivotally secured adjacent its midportion to the upper end of a supporting arm 24. The lever arm 23 and supporting arm 24 extend through an opening in the floor 25 of the vehicle. The supporting arm 24 is integral with a plate 26 which is secured by bolts 27 to the under side of the floor 25.

The end of the plate 26 remote from the arm 24 carries a bracket 28 which extends downwardly from the plate 26. A coil spring 29 is secured at one end to the bracket 28 and at the other end to the lower end of the lever arm 23. The coil spring 29 acts to normally urge the lever arm 23 so that the roller 22 engages the steps 21.

In use, if the vehicle is in an accident, the body of the driver will engage the steering wheel 10 and cause downward movement of the steering column housing 16 within the ball bearings 17. This downward movement will be resisted with increasing pressure as the roller 22 moves successively upwardly along the steps 21, causing the coil spring 29 to be progressively stretched.

With this construction, it is possible for the steering wheel to be depressed only slightly against a small amount of resistance, while a greater downward movement encounters additional resistance.

As a safety feature, I provide a means for cutting off the ignition of the automobile in order to prevent a fire or explosion. This is accomplished by providing an arm 30, which is secured to the steering column housing 16 and which extends outwardly therefrom on the opposite side from the stop member 20. The arm 30 is provided with a semi-circular notch 31 which engages the upper rounded end 32 of a depressible plunger 33. The plunger 33 is mounted for reciprocal vertical movement within a hollow vertical shaft 34. Mounted within the lower end of the shaft 34 beneath the plunger 33 is a coil spring 35. The coil spring 35 acts to maintain the plunger 33 normally in its uppermost position.

The lower end of the shaft 34 extends through an opening 36 which extends through the floor 25 of the vehicle and through the top of a box 37, which is held by bolts 38 to the bottom of the floor 25 adjacent the steering column housing 16 on the opposite side thereof from the bracket 28.

The lower end of the shaft 34 is widened to form a base 39. A rod 40 extends downwardly from the base 39 through an opening in the bottom of the box 37 to act as a guide during the vertical movement of the shaft 34.

A leaf spring 41 extends upwardly and inwardly from one of the lower corners of the box 37 beneath the base 39 and exerts resilient pressure against the base 39 so as to urge it normally toward the top of the box 37. One side of the electrical ignition circuit of the automobile is connected to the leaf spring 41. The other side of the ignition circuit is connected to a second leaf spring 42, which extends upwardly and inwardly from the opposite corner of the box 37.

The inner ends of the leaf springs 41 and 42 normally engage each other to complete the ignition circuit of the vehicle. The ends of the leaf springs 41 and 42 are shown in the drawings as being slightly apart from each other for the purpose of illustrating what happens when the steering column housing 16 is depressed. In such case, the arm 30 is moved downwardly simultaneously with the steering column housing 16. The plunger 33 is depressed, causing the shaft 34 to move downwardly, carrying with it the base 39. As the base 39 moves downwardly against the pressure of the leaf spring 41, it breaks the circuit between leaf springs 41 and 42, opening the ignition circuit of the automobile.

I claim:

1. A depressible steering construction for an automotive vehicle having a dashboard and a floor, comprising a steering wheel mounted on the upper end of an elongated steering column, said steering column being rotatably mounted within a steering column housing, said steering column housing extending through openings in the dashboard and floor of the vehicle, a plurality of ball bearings disposed around each of said openings and engaging said steering column housing to facilitate the longitudinal movement of said steering column housing through said openings, means for preventing the rotatable movement of said steering column housing within said openings, a cam member secured to said steering column housing, said cam member having a vertically extending row of adjacent notches formed therein, said notches extending from the bottom to the top thereof progressively outwardly from said steering column housing, a lever arm pivotally attached to the vehicle adjacent its midportion, the upper end of said lever arm carrying a roller, said roller being adapted to successively engage the notches on said stop member, a coil spring attached to the end of said cam member opposite from said roller, said steering column housing adapted upon downward movement to carry said cam member downwardly and cause said roller and the upper end of said lever arm to move progressively along said notches and away from said steering column housing, such movement causing said lever arm to pivot and move its lower end toward said steering column housing against the resistance of said coil spring.

2. The structure described in claim 1 and means for cutting off the ignition circuit of the vehicle upon the downward movement of said steering wheel, said means comprising an arm secured at one end to said steering column housing, a plunger mounted for reciprocal vertical movement beneath said arm, resilient means resisting the downward movement of said plunger, a pair of contact members electrically connected to the ignition circuit of the vehicle, said steering column housing adapted upon downward movement to carry said arm downwardly, depressing said plunger and separating said contact members to open the ignition circuit of the vehicle.

3. A depressible steering construction for automotive vehicles comprising a steering wheel mounted on the upper end of an elongated steering column, said steering column being rotatably mounted within a steering column housing, a cam member secured to said steering column housing, said cam member having a vertically extending row of adjacent notches formed therein, said notches extending from the bottom to the top thereof progressively outwardly from said steering column housing, a lever arm pivotally attached to the vehicle adjacent its midportion, the upper end of said lever arm carrying a roller, said roller being adapted to successively engage the notches on said cam member, a coil spring attached to the end of said lever arm opposite from said roller, said steering column housing adapted upon downward movement to carry said cam member downwardly and cause said roller and the upper end of said lever arm to move progressively along said notches and away from said steering column housing, such movement causing said lever arm to pivot and move its lower end toward said steering column housing against the resistance of said coil spring.

4. A depressible steering construction for automotive vehicles comprising a steering wheel mounted on the upper end of an elongated steering column, said steering column being rotaatbly mounted within a steering column housing, a cam member carried by said steering column housing, said cam member having a vertically extending row of adjacent notches formed therein, said notches extending from the bottom to the top thereof progressively outwardly from said steering column housing, a lever arm pivotally attached to the vehicle, the upper end of said lever arm being adapted to successively engage the notches on said stop member, a coil spring attached to the lower end of said lever arm said steering column housing adapted upon downward movement to carry said cam member downwardly and cause the upper end of said lever arm to move progressively along said notches and away from said steering column housing, such movement causing said lever arm to pivot and move its lower end toward said steering column housing against the resistance of said coil spring.

5. A depressible steering construction for automotive vehicles comprising a steering wheel mounted on the upper end of an elongated steering column, said steering column being rotatably mounted within a steering column housing, a cam member carried by said steering column housing, said cam member having a vertically extending row of adjacent notches formed therein, said notches extending from the bottom to the top thereof progressively outwardly from said steering column housing, a pivotally mounted lever arm, the upper end of said lever arm being adapted to successively engage the notches on said cam member, a spring attached to the lower end of said lever arm, said steering column housing adapted upon downward movement to carry said cam member downwardly and cause the upper end of said lever arm to move progressively along said notches and away from said steering column housing, such movement causing said lever arm to pivot and move its lower end toward said steering column housing against the resistance of said spring.

6. A depressible steering construction for automotive vehicles comprising a steering wheel mounted on the upper end of an elongated steering column, said steering column being rotatably mounted within a steering column housing, a cam member having a vertically extending row of notches carried by said housing, said notches extending from the bottom to the top thereof progressively outwardly from said housing, a pivotally mounted lever disposed adjacent to said housing, the upper end of said lever adapted to engage said notches, resilient means engaging the lower end of said lever, said housing adapted upon downward movement to cause the upper end of said lever to move progressively along said notches and away from said housing, such movement causing said lever to pivot and move its lower end toward said housing against the urging of said resilient means.

7. A depressible steering construction for automotive vehicles comprising a steering wheel mounted on the upper end of an elongated steering column, said steering column being rotatably mounted within a steering column housing, a cam member having a vertically extending row of notches carried by said housing, said notches extending progressively outwardly with respect to said housing, a member mounted adjacent said housing and adapted to engage said notches, resilient means engaging said member to resist the movement of said member outwardly with respect to said housing, said housing adapted upon downward movement thereof to cause said member to move progressively along said notches and outwardly from said housing against the urging of said resilient means.

8. The structure described in claim 7, and means for cutting off the ignition circuit of the vehicle upon the downward movement of said steering wheel, said means comprising an arm secured at one end to said steering column housing, a plunger mounted for reciprocal vertical movement beneath said arm, resilient means resisting the downward movement of said plunger, a pair of contact members electrically connected to the ignition circuit of the vehicle, said steering column housing adapted upon downward movement to carry said arm downwardly, depressing said plunger and separating said contact members to open the ignition circuit of the vehicle.

References Cited in the file of this patent

UNITED STATES PATENTS

| | | |
|---|---|---|
| 721,859 | Buffum | Mar. 3, 1903 |
| 2,079,536 | Thurber | May 4, 1937 |
| 2,227,821 | Burrell | Jan. 7, 1941 |
| 2,254,640 | Baker | Sept. 2, 1941 |
| 2,639,626 | Snyder | May 26, 1953 |
| 2,744,419 | Chayne | May 8, 1956 |
| 2,779,208 | Pittman et al. | Jan. 29, 1957 |
| 2,800,190 | Dvorak | July 23, 1957 |
| 2,815,676 | Felts et al. | Dec. 10, 1957 |

FOREIGN PATENTS

| | | |
|---|---|---|
| 737,959 | Great Britain | Oct. 5, 1955 |